United States Patent
Hussain (10) Patent No.: US 9,525,905 B2
(45) Date of Patent: Dec. 20, 2016

(54) MAPPING VISUAL DISPLAY SCREEN TO PORTABLE TOUCH SCREEN

(75) Inventor: Zahid Hussain, Halifax (GB)

(73) Assignee: Echostar UK Holdings Limited, Milton Keynes (GB)

(*) Notice: Subject to any disclaimer, the term of this patent is extended or adjusted under 35 U.S.C. 154(b) by 64 days.

(21) Appl. No.: 13/325,964

(22) Filed: Dec. 14, 2011

(65) Prior Publication Data

US 2013/0155095 A1    Jun. 20, 2013

(51) Int. Cl.
- *G09G 5/00*       (2006.01)
- *H04N 21/422*     (2011.01)
- *H04N 21/431*     (2011.01)
- *H04N 21/443*     (2011.01)

(52) U.S. Cl.
CPC .... *H04N 21/42207* (2013.01); *H04N 21/4222* (2013.01); *H04N 21/42209* (2013.01); *H04N 21/42224* (2013.01); *H04N 21/4312* (2013.01); *H04N 21/4431* (2013.01)

(58) Field of Classification Search
CPC .................. G06F 3/0481; G06F 1/1626; G06F 2200/1614; G06T 11/60; G06T 15/60; G06T 5/50; G06Q 30/02; G06Q 30/0269; G06Q 10/10; G06Q 30/0261; G09G 2320/066; G09G 2320/0626; G09G 2360/16; H04N 21/42207
USPC ......................................................... 345/619
See application file for complete search history.

(56) References Cited

U.S. PATENT DOCUMENTS

| | | | | |
|---|---|---|---|---|
| 6,396,523 B1* | 5/2002 | Segal et al. | | 715/863 |
| 6,765,557 B1* | 7/2004 | Segal | | G06F 3/0488 |
| | | | | 345/173 |
| 7,347,780 B1* | 3/2008 | Best | | 463/37 |
| 2003/0025678 A1* | 2/2003 | Lee et al. | | 345/173 |
| 2011/0138416 A1* | 6/2011 | Kang et al. | | 725/39 |
| 2011/0145863 A1 | 6/2011 | Alsina et al. | | |
| 2011/0167447 A1* | 7/2011 | Wong | | 725/40 |
| 2013/0290901 A1 | 10/2013 | Yarita et al. | | |

FOREIGN PATENT DOCUMENTS

EP    2648096 A1    10/2013

OTHER PUBLICATIONS

European Patent Office, Extended Search Report, dated Mar. 12, 2014 for European Application No. 12194873.1.

* cited by examiner

*Primary Examiner* — Ryan R Yang
(74) *Attorney, Agent, or Firm* — LK Global (57) ABSTRACT

A content player transmits a screen image to a display. The screen image includes an active region, which may be a portion that may be manipulated. The player determines active region information for the active region and transmits such to a portable device. The portable device receives the active region information as well as information regarding any inactive regions, which may be portions that may not be manipulated. The portable device utilizes the information to present a simulated version of the screen image on a touch screen. The portable device may then receive manipulation information via the touch screen and transmit such to the player. In response, the player may generate and present an updated version of the screen image, determine updated information, and transmit such to the portable device. The portable device may utilize the updated information to present a simulated updated version of the screen image.

18 Claims, 6 Drawing Sheets

MAPPING VISUAL DISPLAY SCREEN TO PORTABLE TOUCH SCREEN

FIELD OF THE INVENTION

This disclosure relates generally to touch screen interfaces, and more specifically to mapping visual display screens to touch screens.

SUMMARY

The present disclosure discloses systems and methods for mapping visual display screens to touch screens. A content player may present a screen image including one or more active regions by transmitting the screen image to an associated display device. Active regions may be portions of the screen image that are operable to be manipulated by a user. The content player may determine active region information for the active region, which may include position information, color information, interactive information, and other such information regarding the active region. The content player may then transmit such information to a portable touch screen device.

The portable touch screen device may receive the active region information from the content player as well as information regarding one or more inactive regions. Inactive regions may be portions of the screen image that may not be manipulated by a user. The portable touch screen device may utilize the information for active and/or inactive regions to present a simulated version of the screen image on one or more touch screens of the portable touch screen device.

Subsequently, the portable touch screen device may receive manipulation information for one or more of the active regions via the touch screen. The portable touch screen device may transmit such information to the content player. In response, the content player may generate and present an updated version of the screen image via the associated display device. The content player may also determine updated active region information based on the manipulation information and transmit such updated information to the portable touch screen device, which may utilize the updated information to present a simulated updated version of the screen image on the touch screen.

In some implementations, the information regarding the active and/or inactive regions and/or update information may fully describe how to present such regions. In other implementations, one or more screen templates may be modified to generate active and/or inactive regions and/or update such regions and the information and/or update information may specify the screen template utilized and indicate modifications. In still other implementations, the information regarding the active and/or inactive regions may fully describe how to present such regions whereas update information may only include information regarding changes. In yet other implementations, one or more screen templates may be modified to generate active and/or inactive regions, information regarding such regions may specify the screen template utilized and indicate modifications, and update information may include only information regarding changes.

In various implementations, active regions and/or inactive regions may be generated by one or more software applications being executed by the content player. The software application may generate the region by calling one or more graphical APIs (application programming interfaces) provided by one or more operating systems of the content player and the graphical API may generate the region. As part of generating the region, the graphical API may be also be configured to provide information regarding the region. The content player may then determine the information for that region by receiving the information for that region from the graphical API and may combine such information with information regarding other regions before transmitting the combined information to the portable touch screen device.

In one or more implementations, the simulated version of the screen image may not be precisely identical to the screen image. In some cases, the simulated version of the screen image may differ dimensionally from the screen image. In other cases, the simulated version of the screen image may include less information and/or detail than the actual screen image. Regardless, the simulated version of the screen image may resemble the actual screen image enough that users may visually understand the mapping relationship between the two images.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Content players (such as set top boxes, television receivers, digital video recorders, television tuners, digital music players, desktop computers, laptop computers, cellular telephones, smart phones, mobile computing devices, and so on) may present content via one or more presentation devices (such as computer monitors, televisions, cathode ray tube displays, liquid crystal displays, speakers, printers, and/or other such devices for presenting content). The content that such content players may present may be stored by the content player and/or may be received from one or more content providers (such as one or more television programming providers, video on demand providers, pay per view movie providers, digital music providers, and so on) via one or more communication links (such as one or more satellite communication links, coaxial cable communication links, WiFi communication links, Internet protocol communication links, and so on). The operations of such content players may be controlled via one or more control interfaces which may be separate from the content player (such as one or more keyboards, mice, remote control devices, and/or other selection devices) and/or integrated into the content player (such as one or more buttons, keys, and/or other selection elements).

As content players incorporate increasingly complex functions, such as Internet browsing, traditional remote control devices become increasingly difficult and complex for users to utilize in directing the operations of the content player. Other traditional control interfaces, such as keyboards or mice, provide more intuitive options for users to control content players, but even such traditional control interfaces may be increasingly difficult and complex for users to utilize as content players perform increasingly complex functions. Further, control interfaces such as remotes, keyboards, and mice may not be as intuitive for users when interfacing with the increasingly graphical interactive user interfaces that may be provided by content players.

Touch screen interfaces may enable users to more intuitively interact with such interactive displays. As users may directly touch and manipulate the interactive user interface displayed by the screen, users may not have to perform the additional mental processing inherent in translating between selection elements of a control interface and the displayed interactive user interface. This may result in less user confusion than other control interfaces and may generally improve the user's experience in utilizing the content player.

However, many content players display such interactive user interfaces on displays which are not located within reach of a user. For example, set top boxes, television receivers, digital video recorders, television tuners, and/or other content players may display interactive user interfaces on display devices that may be typically located several feet or more away from a user when utilized. In such cases, even if one or more display screens of such display devices are configured as touch screens, users may not be able to utilize the touch screen without physically approaching the display device every time they wish to control the content player. In order to allow users to control content players in such situations without having to physically move to the display device, non-touch screen control interfaces such as remote controls, keyboards, mice, and so on may be utilized. As such, the intuitive features of displaying the interactive user interfaces via a touch screen may be lost.

The present disclosure discloses systems and methods for mapping visual display screens to touch screens. A content player may present a screen image that includes one or more active regions (portions of the screen image that are operable to be manipulated by a user) by transmitting the screen image to an associated display device. The content player may determine active region information for the active region, which may include position information, color information, interactive information (i.e., ways that a user may manipulate the active region), and other such information regarding the active region. The content player may then transmit such information to a portable touch screen device. The portable touch screen device may receive the active region information from the content player (as well as information regarding one or more inactive regions, or regions that may not be manipulated by a user) and utilize such information to present a simulated version of the screen image on one or more touch screens of the portable touch screen device.

Subsequently, the portable touch screen device may receive manipulation information for the active region (i.e., one or more actions that a user has performed on the active region) via the touch screen. The portable touch screen device may transmit such information to the content player and, in response, the content player may generate and present an updated version of the screen image via the associated display device. The content player may also determine updated active region information based on the manipulation information and transmit such updated information to the portable touch screen device. Upon receiving such updated information, the portable touch screen device may utilize the updated information to present a simulated updated version of the screen image on the touch screen.

In this way, interactive user interfaces displayed via the associated display device may be mapped to the touch screen of the portable touch screen device. Though users may not be located within sufficient proximity to touch the associated display device, as the simulated screen image approximates the screen image (though it may not be precisely identical), the users may still be able to interact with any displayed interactive user interfaces without having perform the additional mental processing inherent in translating between selection elements of a control interface and the displayed interactive user interface. As such, controlling the content player may be more intuitive for users than other control interfaces.

Figure 1:
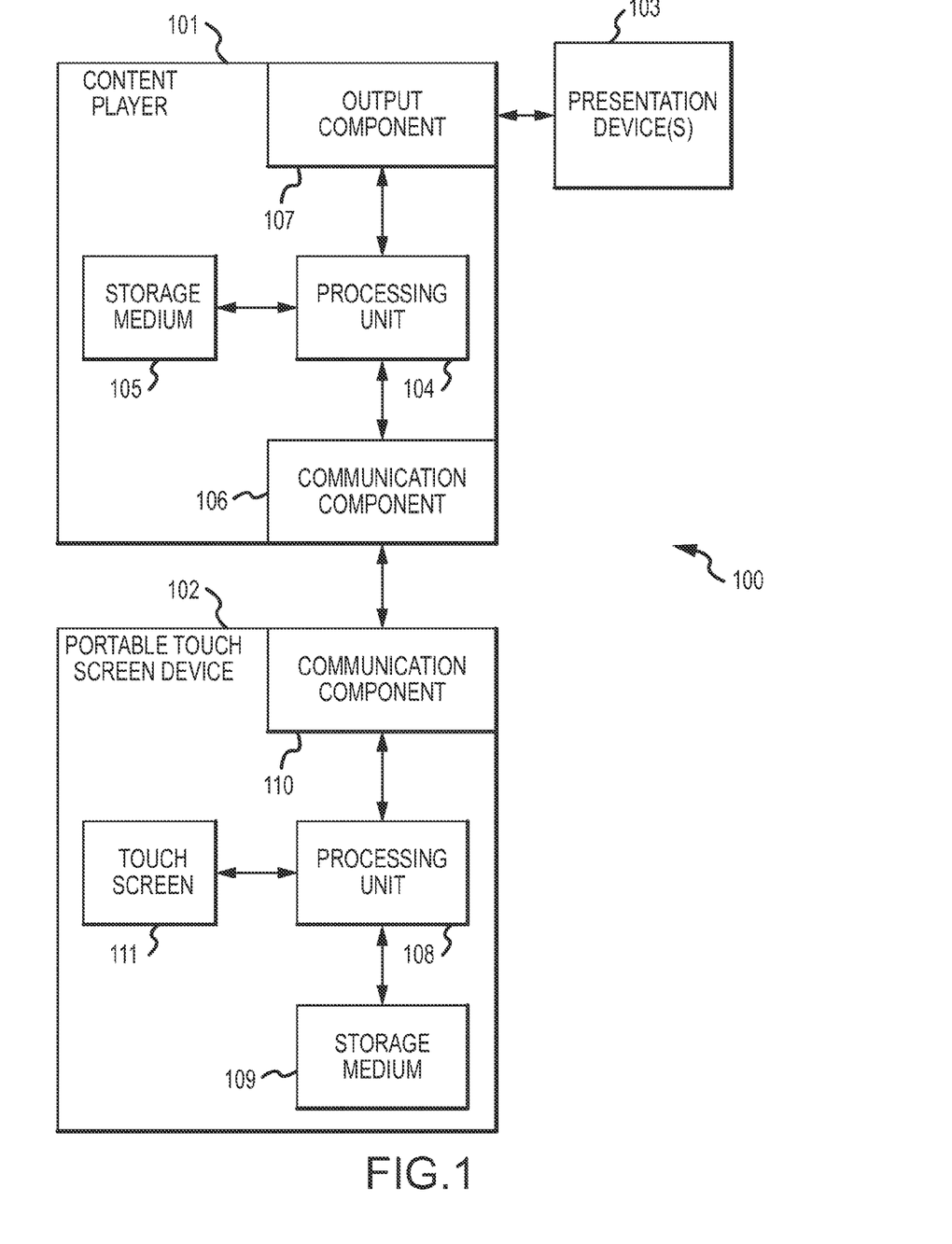
FIG. 1 is a block diagram illustrating a system for mapping visual display screens to touch screens.

FIG. 1 is a block diagram illustrating a system 100 for mapping visual display screens to touch screens. The system 100 includes a content player 101, a portable touch screen device 102, and one or more presentation devices 103. The content player may be any kind of content playing device such as a set top box, a television receiver, a digital video recorder, a television tuner, a digital music player, a desktop computer, a laptop computer, a cellular telephone, a smart phone, a mobile computing device, and/or any other device that presents content via the presentation device 103. The presentation device may be any device such as a computer monitor, a television, a cathode ray tube display, a liquid crystal display, and/or other such device that displays content provided by the content player. The portable touch screen device may be a laptop computer, a cellular telephone, a smart phone, a mobile computing device, and/or any other portable device that includes one or more touch screens.

The content player 101 may include one or more processing units 104, one or more non-transitory storage media 105 (which may take the form of, but is not limited to, a magnetic storage medium; optical storage medium; magneto-optical storage medium; read only memory; random access memory; erasable programmable memory; flash memory; and so on), one or more communication components 106, and/or one or more output components 107. The processing unit 104 may execute instructions stored in the non-transitory storage medium 105 to present content on the presentation device 103 utilizing the output component.

The processing unit 104 may also execute instructions stored in the non-transitory storage medium 105 to present one or more screen images including one or more active regions on the presentation device 103 via the output component 107. When presenting such a screen image, the processing unit 104 may determine information for one or more active regions and/or inactive regions (which may themselves each include one or more active or inactive sub regions) included in the screen image. A region may be an active region if is configured to be manipulated by a user and may be an inactive region if it is configured to not be manipulated by a user. Such information may include position information (such as absolute dimensions and/or position coordinates in the screen image, dimensions and/or position coordinates relative to other portions of the screen image and/or the screen image itself, center point and/or absolute radius/diameter information, center point and/or radius/diameter information relative to other portions of the screen image and/or the screen image itself, and/or any other information specifying dimensions and/or position of the region), color information (such as hue information for one or more portions of the region, brightness information for one or more portions of the region, saturation information for one or more portions of the region, and/or any other information specifying one or more color aspects of one or more potions of the region), interaction information (such as whether the region may be selected, selected and dragged, expanded, resized, deleted, accept text input via a presented virtual keyboard, and/or any other action that may be performed and/or not performed in relation to the region), and/or any other such information regarding the active and/or inactive regions. The processing unit 104 may transmit such information to the portable touch screen device 102 via the communication component 106.

The portable touch screen device 102 may include one or more processing units 108, one or more non-transitory storage media 109, one or more communication components 110, and/or one or more touch screens 111. The processing unit 108 may receive the information regarding one or more active regions and/or inactive regions via the communication component 110 and execute instructions stored in the non-transitory storage medium 109 to present a simulated version of the screen image displayed on the presentation device 103 via the touch screen 111 utilizing the received positional information, color information, interaction information, or other such information.

In some cases, the information regarding one or more active regions and/or inactive regions may fully describe how to present the simulated version of the screen image. In other cases, the screen image may be created by modifying one or more screen templates stored in the non-transitory medium 105. As such, the information may specify the screen template utilized and any modifications performed. In still other cases a combination of these approaches may be utilized.

Such a simulated version of the screen image may not be precisely identical to the screen image. By way of a first example, the dimensions of the touch screen 111 may not be the same as the presentation device 103. As such, the dimensions of the active and/or inactive regions included in the simulated version of the screen image may differ from the actual screen image. By way of another example, active and/or inactive regions included in the simulated version of the screen image may include less information and/or detail (whether in arrangement, color, and/or other such information and/or detail) than the actual screen image. However, even though the simulated version of the screen image may not be precisely identical to the actual screen image, the simulated version of the screen image may resemble the actual screen image enough that users may visually understand the mapping relationship between the two images.

The processing unit 108 of the portable touch screen device 102 may also execute instructions stored in the non-transitory storage medium 109 to receive manipulation information regarding one or more of the active regions (such as whether a region is selected, selected and dragged, expanded, resized, deleted, receives text input via a presented virtual keyboard, and/or any other action that is performed in relation to the region) via the touch screen 111. Such information may be received as a result of one or more users manipulating one or more of the active regions included in the simulated version of the screen image displayed by the touch screen 111. When receiving such manipulation information, the processing unit 108 may restrict manipulation that is received to manipulations that comply with interaction information received from content player 101 specifying how the respective region can be manipulated. The processing unit 108 may transmit such manipulation information to the content player 101 via the communication component 110.

The processing unit 104 of the content player 101 may receive the manipulation information via the communication component 106, utilize such information to generate an updated version of the screen image, and present the updated screen image on the presentation device 103 via the output component 107. The processing unit 104 may also determine updated information for one or more active and/or inactive regions included (and/or not included if the manipulation information corresponds to removal of the respective region) in the updated screen image and transmit such updated information to the portable touch screen device 102 via the communication component 106. Additionally, the processing unit 104 may perform one or more content player 101 operations in response to the manipulation information such as presenting content, switching content that is presented, and/or any other operation that the content player 101 is configured to perform as controlled by the portable touch screen device 102.

The processing unit 108 of the portable touch screen device 102 may receive such update information via the communication component 110 and may utilize such to present a simulated updated version of the screen image on the touch screen 111. In some cases, such update information may fully describe how to present the simulated updated version of the screen image. In other cases, such update information may only specify changes from the simulated version of the screen image. In still other cases a combination of these approaches may be utilized.

Although the above discusses updating the screen image and the corresponding simulated screen image, in some cases processing unit 104 of the content player 101 may generate one or more additional screen images in response to the manipulation information that may be unrelated to the original screen image (i.e., display a different screen). As such, the updated screen image may be a completely different screen image. Further, although the above describes a single round of presentation of a screen image, manipulation, and updating of the screen image, multiple iterations of such operations may be performed without departing from the scope of the present disclosure.

Figure 2:
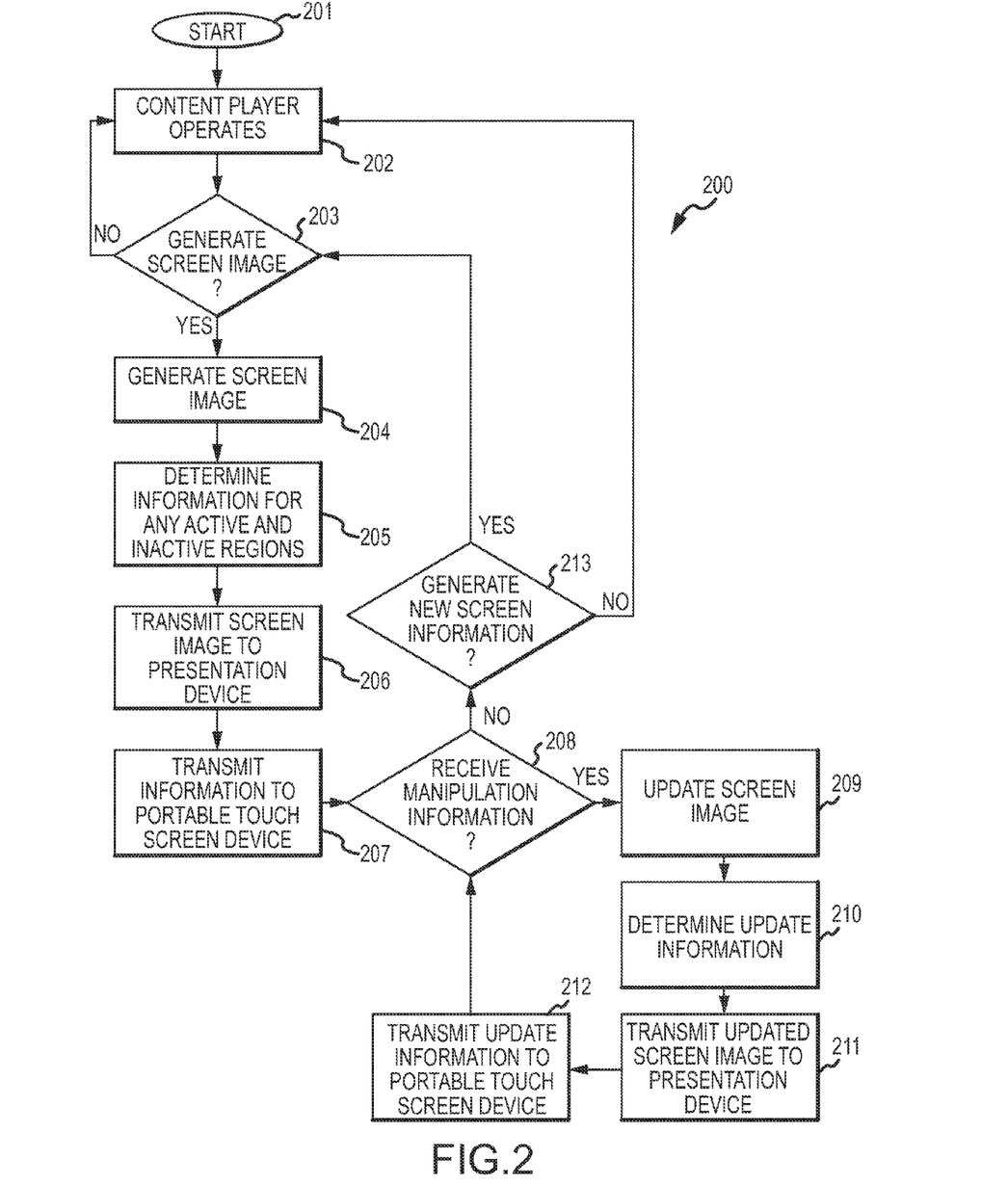
FIG. 2 is a flow chart illustrating a first method for mapping visual display screens to touch screens. This method may be performed by the content player of FIG. 1.

FIG. 2 illustrates a first method 200 for mapping visual display screens to touch screens. The method 200 may be performed by the content player 101 of FIG. 1. The flow begins at block 201 and proceeds to block 202 where the content player operates. The flow then proceeds to block 203 where the processing unit 104 determines whether or not to generate a screen image. The processing unit 104 may determine to generate the screen image as part of performing other operations and/or in response to received input. If so, the flow proceeds to block 204. Otherwise, the flow returns to block 202 where the content player 101 continues to operate.

At block 204, after the processing unit 104 determines to generate a screen image, the processing unit 104 generates the screen image. The screen image may include one or more active regions and/or one or more inactive regions (which may themselves include one or more active or inactive sub regions). The flow then proceeds to block 205 where the processing unit 205 determines information for one or more active regions and/or inactive regions included in the screen image. Next, the flow proceeds to block 206 where the processing unit 104 transmits the screen image to the presentation device 103 via the output component 107. The flow then proceeds to block 207 where the processing unit 104 transmits the information regarding the active and/or inactive regions to the portable touch screen device 102 via the communication component 106.

Next, the flow proceeds to block 208 where the processing unit 104 determines whether or not manipulation information for the screen image is received from the portable touch screen device 102 via the communication component 106. If so, the flow proceeds to block 209. Otherwise, the flow proceeds to block 213.

At block 209, after the processing unit 104 determines that manipulation information is received, the processing unit 104 updates the screen image utilizing the manipulation information. The flow then proceeds to block 210 where the processing unit 104 determines update information for the screen image based at least one the manipulation information. Next, the flow proceeds to block 211 where the processing unit 104 transmits the updated screen image to the presentation device 103 via the output component 107. The flow then proceeds to block 212 where the processing unit 104 transmits the update information to the portable touch screen device 102 via the communication component 106 before the flow returns to block 208 and the processing unit 104 determines whether or not additional manipulation information for the updated screen image is received.

At block 213, after the processing unit 104 determines that manipulation information is not received, the processing unit 104 determines whether or not to generate a new screen image. The processing unit 104 may determine to generate the new screen image as part of performing other operations and/or in response to received input. If so, the flow returns to block 203 where the processing unit 104 generates the new screen image. Otherwise, the flow returns to block 202 where the content player 101 continues to operate.

Although the method 200 is illustrated and described above as including particular operations configured in a particular arrangement, other arrangements of different operations are possible without departing from the scope of the present disclosure. For example, the method 200 describes transmitting the screen image to the presentation device before transmitting the information regarding the active and/or inactive regions to the portable touch screen device 102. However, in other implementations such operations may be performed in a reverse order and/or simultaneously.

Figure 3:
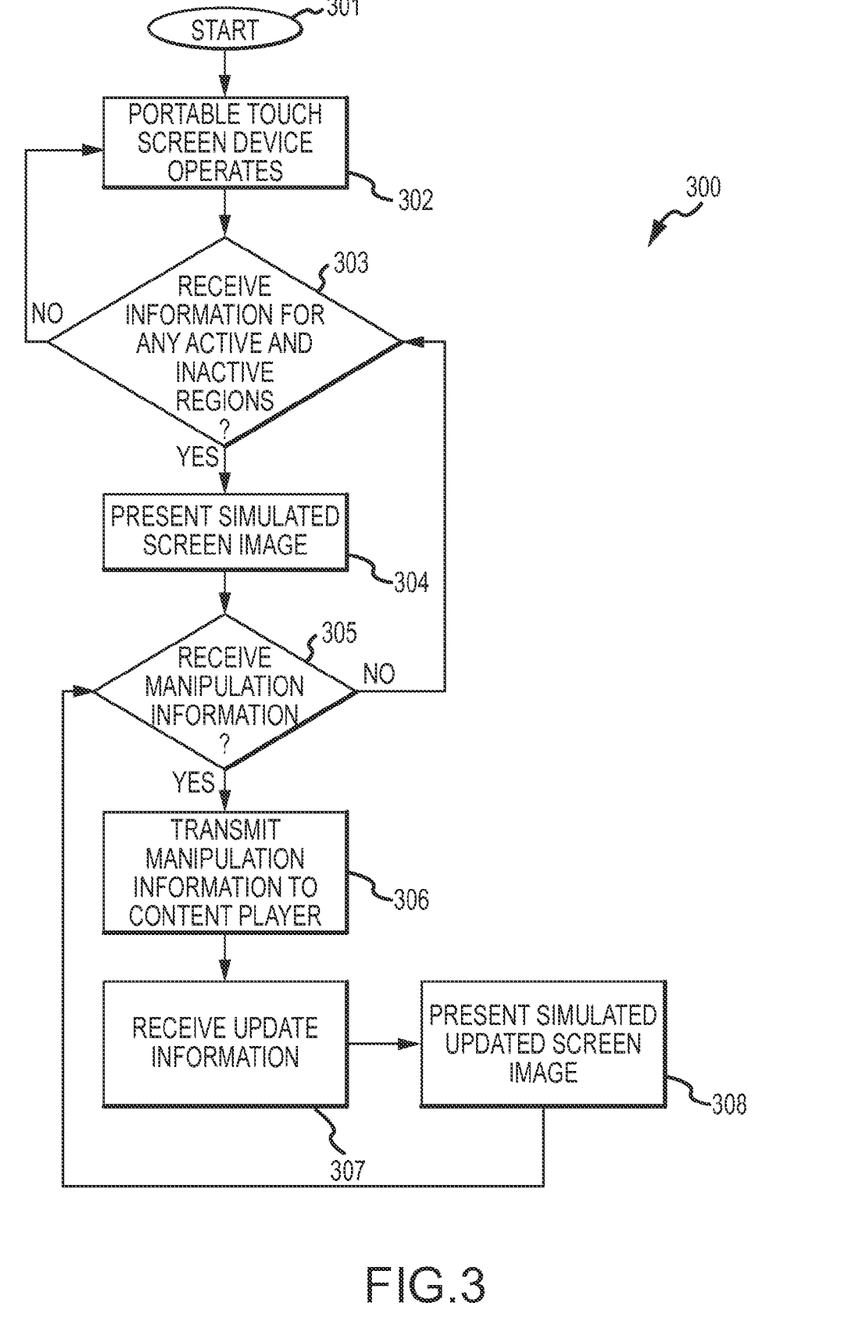
FIG. 3 is a flow chart illustrating a second method for mapping visual display screens to touch screens. This method may be performed by the portable touch player device of FIG. 1.

FIG. 3 illustrates a second method 300 for mapping visual display screens to touch screens. The method 300 may be performed by the portable touch screen device 102 of FIG. 1. The flow begins at block 301 and proceeds to block 302 where the portable touch screen device 102 operates. The flow then proceeds to block 303 where the processing unit 108 determines whether or not information for active and/or inactive regions of a screen image is received. If so, the flow proceeds to block 304. Otherwise, the flow returns to block 302 where the portable touch screen device 102 continues to operate.

At block 304, after the processing unit 108 determines whether or not information for active and/or inactive regions of a screen image is received, the processing unit 108 utilizes the information to present a simulated version of the screen image via the touch screen 111 before the flow proceeds to block 305.

At block 305 the processing unit 108 determines whether or not manipulation information for one or more of the active regions of the simulated version of the screen image is received via the touch screen 111. If so, the flow proceeds to block 306. Otherwise, the flow returns to block 303 where the processing unit determines whether or not information for active and/or inactive regions of another screen image is received.

At block 306, after the processing unit 108 determines manipulation information is received, the processing unit 108 transmits the manipulation information to the content player 101 via the communication component 110 and the flow proceeds to block 307. At block 307, the processing unit 108 receives update information from the content player 101 via the communication component 110. Next, the flow proceeds to block 308 where the processing unit 108 utilizes the update information to present a simulated updated version of the screen image via the touch screen 111.

The flow then returns to block 305 where the processing unit 108 determines whether or not manipulation information for one or more of the active regions of the simulated updated version of the screen image is received via the touch screen 111.

Although the method 300 is illustrated and described above as including particular operations configured in a particular arrangement, other arrangements of different operations are possible without departing from the scope of the present disclosure. For example, the method 300 describes receiving update information after transmitting manipulation information. However, in other implementations, update information may not be received after transmitting manipulation information and the processing unit 108 may respond by retransmitting the manipulation information.

Returning to FIG. 1, in some implementations, one or more active regions and/or inactive regions generated by the processing unit 104 as part of generating a screen image may be generated by one or more software applications (such as one or more social networking applications, Internet browser applications, office applications, and/or any other software application) being executed by the processing unit 104. The software application may generate the region by calling one or more graphical APIs provided by one or more operating systems being executed by the processing unit 104. The graphical API may then generate the region according to the call from the software application.

As part of generating the region, the graphical API may be also be configured to transmit information regarding the region (such as positional information of the region and/or sub regions, color information for the region and/or sub regions, interaction information for the region and/or sub regions) to the processing unit 104. The processing unit 104 may then determine the information for that region by receiving the information for that region from the graphical API and may combine such information received from the graphical API with information regarding other regions before transmitting the combined information to the portable touch screen device via the communication component 106.

Figure 4A:
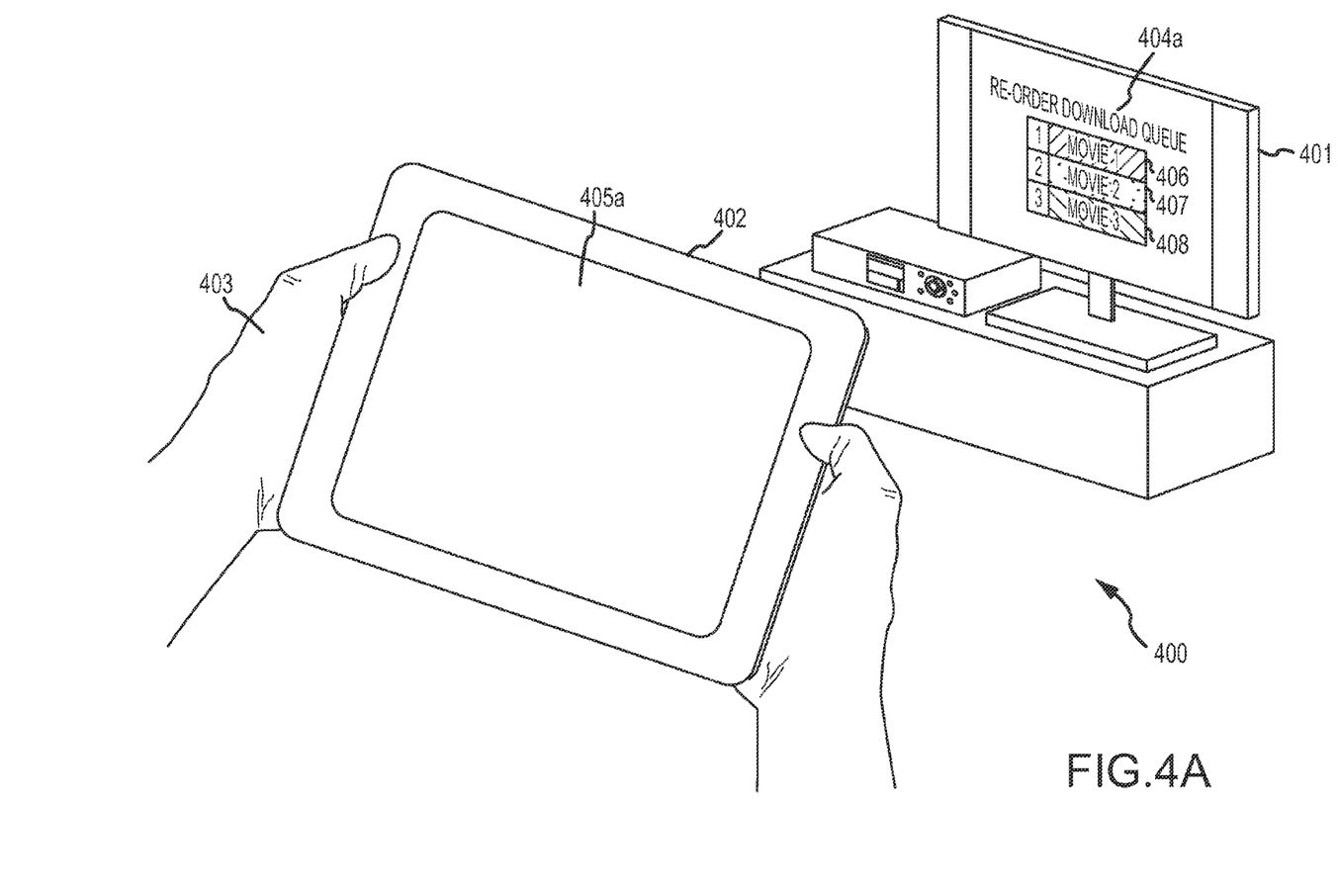
FIGS. 4A-4C are diagrams illustrating an example of a user utilizing a system for mapping visual display screens to touch screens. The system may be the system of FIG. 1.
Figure 4B:
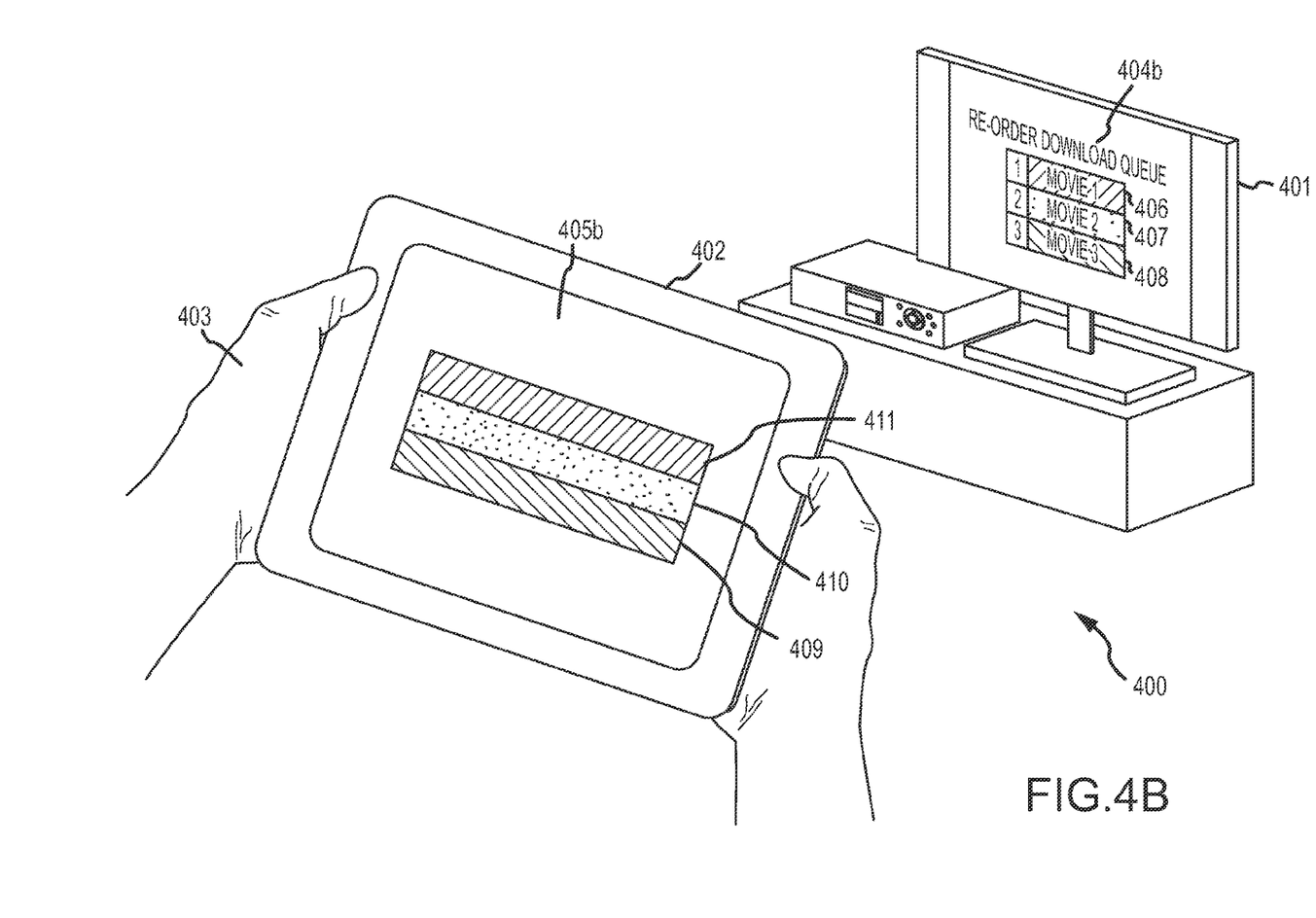
Figure 4C:
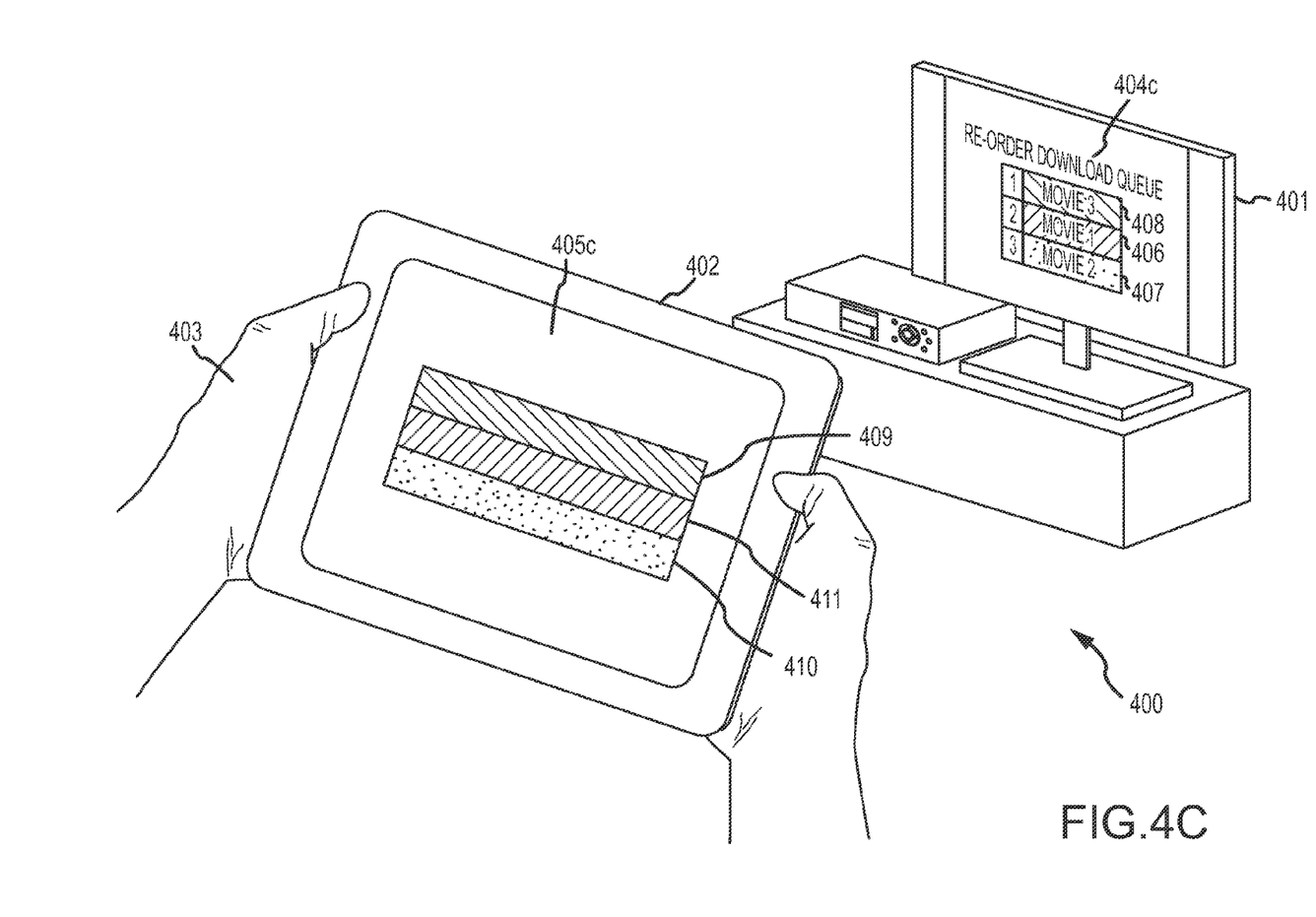

FIGS. 4A-4C illustrate an example of a user 403 utilizing a system 400 for mapping visual display screens 404*a*-404*c* to touch screens 405*a*-405*c*. The system may be the system of FIG. 1. As illustrated in FIG. 4A, a television 401 displays an interactive menu 404*a* for reordering a movie download queue of movies being downloaded from a content provider.

As further illustrated, the download queue includes screen elements for three movies "Movie 1" 406, "Movie 2" 407, and "Movie 3" 408 and the download queue is organized such that Movie 1 will be downloaded first followed by Movie 2 which will then be followed by Movie 3.

The television 401 may generate information for active regions and/inactive regions in the interactive menu 404*a*. In this example, the screen elements 406-408 for the three movies are active elements and the portion of the screen around the screen elements 406-408 for the three movies is an inactive region. The television 401 may generate positional information and color information for the active and inactive information as well as interaction information for the active regions (i.e., how the screen elements 406-408 for the three movies can be manipulated to reorder the download queue). The television 401 may transmit this information to a tablet computing device 402 being utilized by the user 403, as illustrated in FIG. 4B.

As illustrated in FIG. 4B, the tablet computing device 402 utilizes the information to present a simulated version 405*b* of the interactive menu 404*b* that includes screen elements 411 (corresponding to screen element 406 of the interactive menu 404*b*), 410 (corresponding to screen element 407 of the interactive menu 404*b*), and 406 (corresponding to screen element 408 of the interactive menu 404*b*). In this example, the simulated version 405*b* of the interactive menu 404*b* does not precisely mirror the interactive menu 404*b*. Instead, the simulated version 405*b* of the interactive menu 404*b* is a simplified version of the interactive menu 404*b* where text information included in the interactive menu 404*b* has been omitted. However, the simulated version 405*b* of the interactive menu 404*b* may resemble the interactive menu 404*b* closely enough that the user 403 may mentally treat the simulated version 405*b* of the interactive menu 404*b* as if it were the interactive menu 404*b*.

In this example, the user 403 may utilize the touch screen of the tablet computing device 402 to manipulate the screen elements 409-411 of the simulated version 405*b* of the interactive menu 404*b* by touching the touch screen in order to reorder the download queue. The user 403 may touch and drag the screen element 409 to movie it above the screen element 411. The tablet computing device 402 may receive this manipulation information and transmit such to the television 401. As illustrated in FIG. 4C, in response the television 401 may reorder the download queue accordingly, update the interactive menu 404*c*, and transmit corresponding update information to the mobile computing device 402 which may then present the simulated version 405*c* of the interactive menu 404*c*.

As shown in FIG. 4C, the screen element 408 corresponding to Movie 3 is now at the top of the download queue in the interactive menu 404*c*, followed by the screen element 406 corresponding to Movie 1 and the screen element 407 corresponding to movie 2. Further, the screen element 409 of the simulated version 405*c* of the interactive menu 404*c*, the screen element 411 of the simulated version 405*c* of the interactive menu 404*c*, and the screen element 410 of the simulated version 405*c* of the interactive menu 404*c* are rearranged similarly to their respective corresponding screen elements 406-408 of the interactive menu 404*c*. As such, the television 401 may download Movie 3 first, then Movie 1, and then Movie 2.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method executable by a content player device to map visual display screens to touch screens, the method comprising:
    providing, by the content player device executing a graphical API, a screen image to a first display associated with the content player device, wherein the screen image includes at least one active region generated by the graphical API in response to a call from the at least one content player that corresponds to a portion of the screen image that is operable to be manipulated by a user input received from a user;
    identifying, by the processing of the screen image by the graphical API of the content player device, the portions of the screen image that are operable to be manipulated by the user to thereby automatically determine active region information describing the at least one active region, the active region information determined by the graphical API of the content player device including position information about the portion of the screen image that is operable to be manipulated by the user; and
    transmitting the active region information from the content player device to a portable touch screen device wherein the portable touch screen device presents a simulated version of the screen image on a touch screen display that is different and separate from the first display, wherein the simulated version of the screen image presented on the touch screen display of the portable touch screen device comprises input regions that are mapped to the active regions of the screen image presented on the first display based upon the active region information that was automatically determined by the graphical API of the content player device, and wherein the at least one portable touch screen device accepts the user input corresponding to the active regions from the touch screen display and provides information about the user input accepted from the touch screen display to the content player device so that the user is able to manipulate the portions of the screen image on the first display by using the portable touch screen device.

2. The method of claim 1, further comprising:
receiving manipulation information corresponding to the user input for the at least one active region at the content player device from the portable touch screen device;
generating, utilizing the graphical API of the content player device, an updated version of the screen image utilizing the manipulation information;
providing, by the content player device, the updated version of the screen image for presentation on the first display.

3. The method of claim 1, further comprising:
determining, utilizing the content player device, updated active region information for the at least one active region; and
transmitting the updated active region information from the content player device to the portable touch screen device wherein the portable touch screen device utilizes the updated active region information to provide a simulated updated version of the updated screen image for presentation on the touch screen display.

4. The method of claim 1, wherein the screen image includes at least one inactive region and wherein the active region information is transmitted with inactive region information for the at least one inactive region from the content player to the portable touch screen device, and wherein the portable touch screen device utilizes both the active region information and the inactive region information to present the simulated version of the screen image.

5. The method of claim 1, wherein the active region information further includes interaction information for the at least one active region specifying how the at least one active region can be manipulated by the user input.

6. The method of claim 1 further comprising the content player device receiving content that comprises the screen image, and wherein the graphics API executed by the content player device identifies the active regions in the screen image based upon imagery contained in the content.

7. A method for mapping visual display screens to touch screens, the method comprising:
receiving, by at least one portable touch screen device, active region information from at least one content player, wherein the active region information includes at least position information for at least one active region of that is operable to be manipulated by a user providing a user input, wherein the position information is automatically determined by a graphics API of a content player device that generates the screen image for presentation to a first display by the content player device;
presenting, utilizing the at least one portable touch screen device, a simulated version of the screen image utilizing the active region information on at least one touch screen that is separate from the first display, wherein the simulated version comprises active regions that are able to accept user inputs that are mapped to the active regions of the screen image presented on the first display using the position information that was automatically determined by the at least one content player;
receiving manipulation information corresponding to the user input, utilizing the at least one portable touch screen device, for the at least one active region via the at least one touch screen; and
transmitting the manipulation information for the at least one active region from the at least one portable touch screen device to the at least one content player so that the graphics API of the content player device is able to manipulate the portions of the screen image on the first display in response to the user inputs received by the portable touch screen device.

8. The method of claim 7, further comprising:
receiving, utilizing at least one portable touch screen device, updated active region information from the at least one content player that the at least one content player obtained by updating the screen image utilizing the manipulation information for the at least one active region;
presenting, utilizing the at least one portable touch screen device, a simulated updated version of the screen image utilizing the updated active region information on the at least one touch screen.

9. The method of claim 7, wherein the active region information further includes interaction information for the at least one active region specifying how the at least one active region can be manipulated wherein said operation of receiving manipulation information, utilizing the portable touch screen device, for the at least one active region via the touch screen further comprises accepting the received manipulation information if the received manipulation information is compatible with the interaction information.

10. A content player device for mapping visual display screens to touch screens, the content player comprising:
a video output that outputs a screen image including an active region corresponding to a portion of the screen image that is operable to be manipulated by a user input received from a user;
a processor configured to execute a graphics API that identifies the portions of the screen image that are operable to be manipulated by the user and thereby automatically determines active region information describing the active region, the active region information including position information determined by the graphics API about the portion of the screen image that is operable to be manipulated by the user input; and
a wireless communications interface that transmits the active region information automatically determined by the graphics API to a portable touch screen device;
wherein the portable touch screen device utilizes the active region information to present a simulated version of the screen image on a touch screen display that is different from the presentation device, wherein the simulated version comprises a second active region that is mapped to the active region of the screen image presented on the first display using the position information automatically determined by the content player, and wherein the portable touch screen device accepts the user input corresponding to the active regions from the touch screen display and provides information about the user input accepted from the touch screen display to the content player so that the graphics API is able to manipulate the portions of the screen image on the first display by using in response to the user input received via the portable touch screen device.

11. The content player of claim 10, wherein the portable touch screen device comprises:
a portable touch screen device communication component that receives the active region information;
the touch screen; and
a portable touch screen device processing unit that utilizes the active region information to present the simulated version of the screen image on the touch screen;
wherein the portable touch screen device processing unit receives manipulation information corresponding to the user input for the active region via the touch screen and transmits the manipulation information to the content player via the portable touch screen device communication component.

12. The content player of claim 11, wherein the processor receives the manipulation information via the at least one communication component, generates an updated version of the screen image utilizing the manipulation information, and transmits the updated version of the screen image to the at least one presentation device via the at least one communication component.

13. The content player of claim 12, wherein the at least one processing unit determines updated active region information for the at least one active region after generating the updated version of the screen image and transmits the updated active region information to the at least one portable touch screen device via the at least one communication component.

14. The content player of claim 13, wherein the at least one portable touch screen device communication component receives the updated active region information and the at least one portable touch screen device processing unit utilizes the updated active region information to present a simulated updated version of the screen image on the at least one touch screen.

15. The content player of claim 11, wherein the active region information further includes interaction information for the at least one active region specifying how the at least one active region can be manipulated wherein the at least one portable touch screen device processing unit receives manipulation information for the at least one active region by accepting the received manipulation information if the received manipulation information is compatible with the interaction information.

16. The content player of claim 10, wherein the at least one processing unit generates the screen image by modifying at least one of a plurality of screen templates stored in at least one tangible medium, the active region information identifies the at least one of the plurality of screen templates and modification information, and the at least one portable touch screen device processing unit utilizes the identified at least one of the plurality of screen templates and modification information to present the simulated version of the screen image on the at least one touch screen.

17. The content player of claim 10, wherein the at least one active region corresponds to at least one software application executing on the at least one content player and the at least one processing unit utilizes the output component to present the at least one active region in the screen image by the at least one software application calling the graphics API.

18. The content player of claim 10, wherein the screen image includes at least one inactive region and the at least one processing unit transmits inactive region information for the at least one inactive region to the at least one portable touch screen device via the at least one communication component wherein the at least one portable touch screen device utilizes the active region information and the inactive region information to present the simulated version of the screen image.

* * * * *